United States Patent
Wilton

(10) Patent No.: US 12,405,356 B2
(45) Date of Patent: Sep. 2, 2025

(54) GmAPD DATA NORMALIZATION USING BERNOULLI TRIALS

(71) Applicant: LG INNOTEK CO., LTD., Seoul (KR)

(72) Inventor: Samuel Richard Wilton, Trenton, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 987 days.

(21) Appl. No.: 17/507,701

(22) Filed: Oct. 21, 2021

(65) Prior Publication Data

US 2022/0373658 A1 Nov. 24, 2022

Related U.S. Application Data

(60) Provisional application No. 63/191,737, filed on May 21, 2021.

(51) Int. Cl.
- *G01S 7/48* (2006.01)
- *G01S 7/481* (2006.01)
- *G01S 7/4865* (2020.01)
- *G01S 17/931* (2020.01)

(52) U.S. Cl.
CPC .......... *G01S 7/4865* (2013.01); *G01S 7/4816* (2013.01); *G01S 17/931* (2020.01)

(58) Field of Classification Search
USPC ....................................................... 356/4.01
See application file for complete search history.

(56) References Cited

U.S. PATENT DOCUMENTS

| | | | | |
|---|---|---|---|---|
| 8,885,883 | B2 * | 11/2014 | Goodman | G01S 17/87 382/103 |
| 9,200,953 | B2 * | 12/2015 | Mazzillo | G01J 9/00 |
| 10,338,223 | B1 | 7/2019 | England et al. | |
| 10,401,866 | B2 | 9/2019 | Rust | |
| 10,620,301 | B2 | 4/2020 | Wilton | |
| 10,663,584 | B2 * | 5/2020 | Sakai | G01S 17/89 |
| 10,877,133 | B2 | 12/2020 | Kienzler et al. | |
| 11,630,209 | B2 * | 4/2023 | Chen | G01S 13/865 701/23 |
| 2013/0022241 | A1 | 1/2013 | Goodman | |
| 2013/0030763 | A1 * | 1/2013 | Mazzillo | G01J 9/00 702/179 |

(Continued)

OTHER PUBLICATIONS

Y. Altmann, R. Aspden, M. Padgett and S. McLaughlin, "A Bayesian Approach to Denoising of Single-Photon Binary Images," in IEEE Transactions on Computational Imaging, vol. 3, No. 3, pp. 460-471, Sep. 2017, (Year: 2017).*

(Continued)

*Primary Examiner* — James R Hulka
(74) *Attorney, Agent, or Firm* — Birch, Stewart, Kolasch & Birch, LLP

(57) ABSTRACT

Lidar systems may use highly sensitive GmAPD detectors to track obstacles in the environment of an autonomous vehicle. Data sensed by a lidar GmAPD detector can be pre-conditioned to facilitate differentiating low intensity signals from background noise. By sampling raw avalanche counts accumulated by the detector as Bernoulli trials, binomial statistics can be leveraged to transform raw data to a probability distribution, and then to a normalized data set suitable for signal processing.

20 Claims, 20 Drawing Sheets

(56) References Cited

U.S. PATENT DOCUMENTS

| | | | |
|---|---|---|---|
| 2017/0300059 A1* | 10/2017 | Rust | G05D 1/0231 |
| 2018/0203158 A1* | 7/2018 | Ulmer | G01S 17/86 |
| 2018/0259645 A1* | 9/2018 | Shu | G01S 7/497 |
| 2018/0341019 A1 | 11/2018 | Sakai et al. | |
| 2018/0364337 A1* | 12/2018 | Wilton | G01S 17/10 |
| 2018/0372851 A1* | 12/2018 | Kienzler | G01S 17/894 |
| 2019/0061771 A1 | 2/2019 | Bier et al. | |
| 2019/0179027 A1* | 6/2019 | Englard | G06V 10/776 |
| 2019/0250257 A1* | 8/2019 | Finkelstein | H04N 25/773 |
| 2020/0158669 A1* | 5/2020 | Plenio | G01N 24/10 |
| 2021/0011161 A1 | 1/2021 | Chen et al. | |
| 2021/0033706 A1 | 2/2021 | Funaya | |
| 2022/0026920 A1* | 1/2022 | Ebrahimi Afrouzi | G06N 7/01 |

OTHER PUBLICATIONS

Heide F, Diamond S, Lindell DB, Wetzstein G. Sub-picosecond photon-efficient 3D imaging using single-photon sensors. Sci Rep. Dec. 7, 2018;8(1):17726. (Year: 2018).*

* cited by examiner

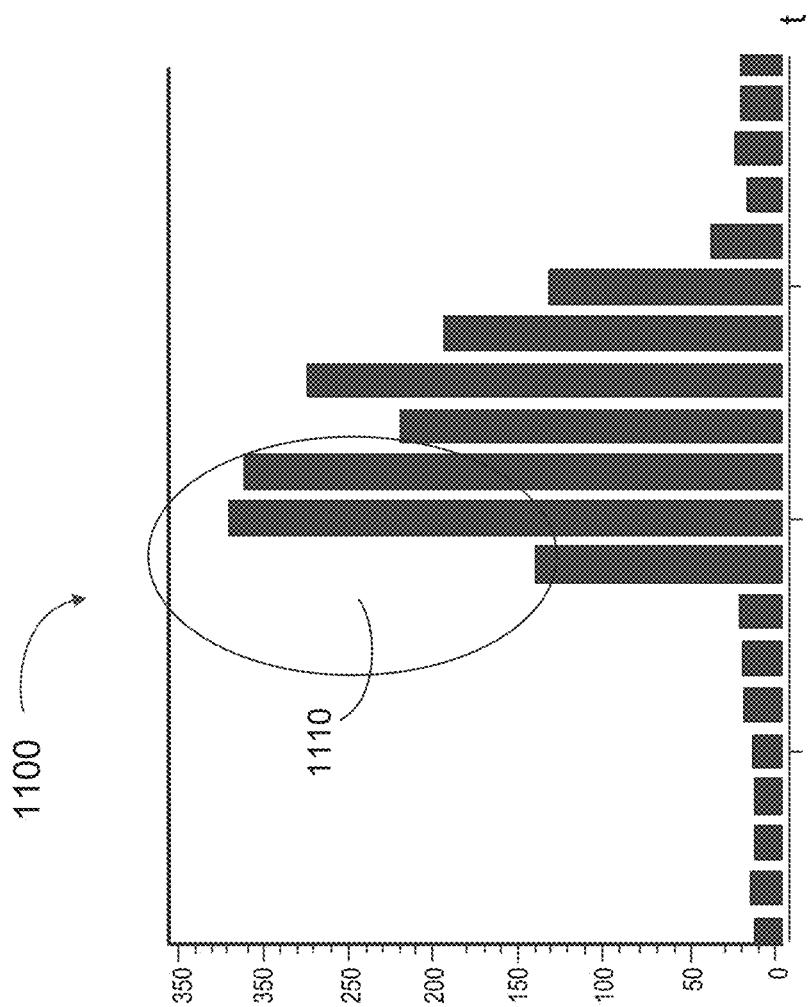

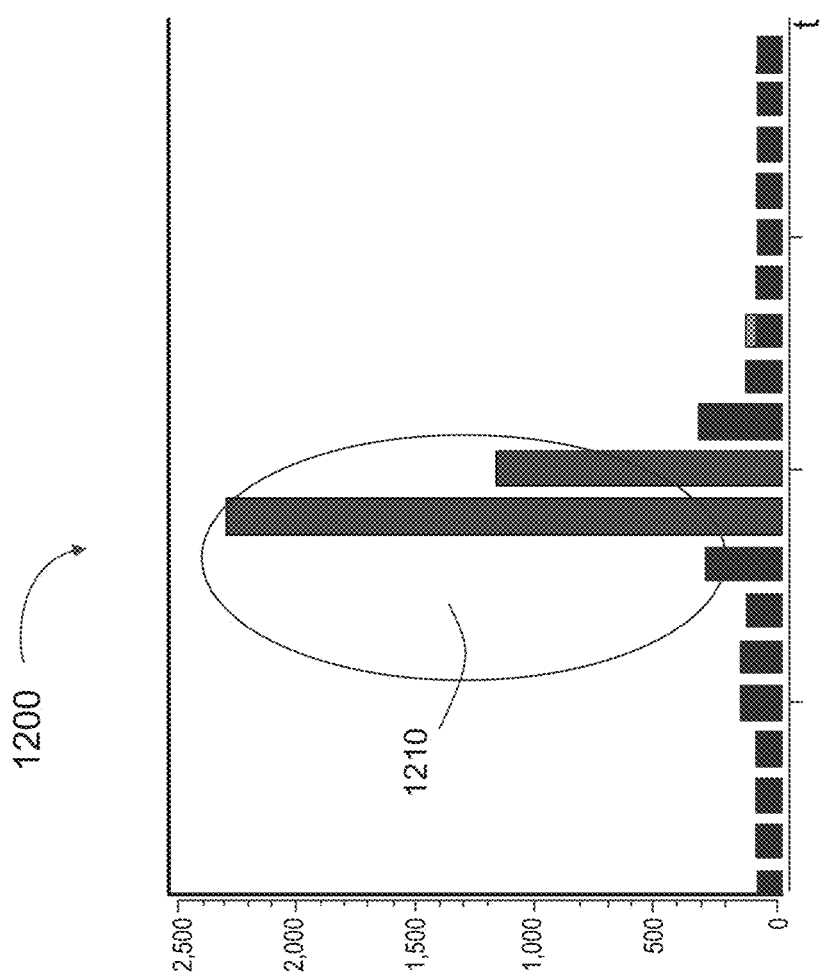

GmAPD DATA NORMALIZATION USING BERNOULLI TRIALS

CROSS-REFERENCE TO RELATED APPLICATION

This patent application claims the benefit of U.S. Provisional Patent Application No. 63/191,737 filed on May 21, 2021 and titled "GmAPD Data Normalization Using Bernoulli Trials," which is incorporated by reference herein in its entirety.

BACKGROUND

Light Detection and Ranging (lidar) technology provides a way to directly measure distances of objects from a lidar sensor. A lidar apparatus, like a radar apparatus, generally includes a transmitter and a receiver, or sensor, co-located in the same housing. The lidar transmitter emits light, e.g., a pulsed laser beam, which reflects from objects in its path. Reflected light is then detected by the lidar sensor, and the detected signal is analyzed to determine a range of the object, or target, that is, the distance between the target and the lidar sensor. Such lidar range measurements are inherently limited by a transmission delay—the time required for a light pulse to travel a round trip distance between the detector and the target, or time-of-flight (TOF). Given the speed of light in air, the round trip signal TOF is 0.67 microseconds for every 100 m of distance between the sensor and the target.

The lidar transmitter may emit repeated laser beam pulses at a fixed pulse emission rate. When a pulse is emitted, the detector may be activated, or "armed," for a time interval t, to detect TOF reflections of that pulse. After an activation time t, the detector is disarmed. Each time interval during which the detector is armed is referred to as a lidar frame, or "range gate." Reflections from repeated laser beam pulse emissions within the time interval are aggregated into the lidar frame.

The frame duration limits the TOF, and therefore the range, of detectable objects, to less than a maximum range, $R_{max}$, or equivalently, to within a measureable range window, $0 \le R \le R_{max}$. The lidar detector is generally armed for a finite period of time corresponding to $R_{max}$. For example, if a lidar emits a single light pulse and the detector is armed for 2 µs, the light sensor will detect only return signals having a time-of-flight of 2 µs or less, corresponding to a maximum range of 300 m. Light reflecting from objects farther away than 300 m will not have time to make a round trip back to the detector before it disarms.

The lidar receiver may be equipped with a Geiger-mode avalanche photodiode (GmAPD) type of single-photon detector, which absorbs incident photons and generates a current according to the photoelectric effect. When an APD is operated above its breakdown voltage, in a high-gain mode, it is referred to as a Geiger-mode APD. As soon as an avalanche is detected, the GmAPD dis-arms to allow charge to dissipate, and the detector remains off until it is re-armed. A GmAPD may be configured such that, in response to an incident photon, the current produced will a) generate a time stamp of the detected photon, b) increment a counter, c) dis-arm the detector, and d) re-set, or re-arm the detector. The timestamp is used to calculate range, while the counter accumulates statistics to determine intensity of the reflected signal.

Because GmAPD detectors are so highly sensitive, they are susceptible to background noise, which must be filtered out or otherwise distinguished from signals by applying various signal processing techniques. Sources of background noise include solar background noise, and false detections, or "dark counts."

SUMMARY

A method includes detecting laser signals reflected from a target, by sensing an accumulation of single photons using a high sensitivity Geiger-mode avalanche photodiode (GmAPD) detector; creating an avalanche histogram from the detected laser signals; transforming the avalanche histogram to an avalanche probability histogram by framing raw data from the GmAPD detector as a sequence of Bernoulli trials within a timestamp interval and applying a binomial confidence estimation; transforming the avalanche probability histogram into a linearized intensity histogram by correcting waveform distortion; and determining a photon intensity of the reflected laser signals from an average count rate and an average photon flux rate associated with the linearized intensity histogram.

A system includes a lidar apparatus configured to transmit and receive laser signals; and a controller communicatively coupled to the lidar apparatus, the controller having a memory configured to store instructions and at least one processor coupled to the memory and configured to execute the instructions, to perform operations comprising detecting laser signals reflected from a target, by sensing an accumulation of single photons using a high sensitivity Geiger-mode avalanche photodiode (GmAPD) detector of the lidar apparatus; creating an avalanche histogram from the detected laser signals; transforming the avalanche histogram to an avalanche probability histogram by framing raw data from the GmAPD detector as a sequence of Bernoulli trials within a timestamp interval and applying a binomial confidence estimation; transforming the avalanche probability histogram into a linearized intensity histogram by correcting waveform distortion; and determining a photon intensity of the reflected laser signals from an average count rate and an average photon flux rate associated with the linearized intensity histogram.

A non-transitory computer-readable medium has instructions stored thereon that, when executed by at least one computing device, cause the at least one computing device to perform operations including detecting laser signals reflected from a target, by sensing an accumulation of single photons using a high sensitivity Geiger-mode avalanche photodiode (GmAPD) detector of the lidar apparatus; creating an avalanche histogram from the detected laser signals; transforming the avalanche histogram to an avalanche probability histogram by framing raw data from the GmAPD detector as a sequence of Bernoulli trials within a timestamp interval and applying a binomial confidence estimation; transforming the avalanche probability histogram into a linearized intensity histogram by correcting waveform distortion; and determining a photon intensity of the reflected laser signals from an average count rate and an average photon flux rate associated with the linearized intensity histogram.

BRIEF DESCRIPTION OF THE DRAWINGS

The accompanying drawings are incorporated herein and form a part of the specification.

FIGS. 11A and 11B are avalanche and intensity histograms, respectively, from a low reflectance target, in accordance with aspects of the disclosure.

FIGS. 12A and 12B are avalanche and intensity histograms, respectively, from a high reflectance target, in accordance with aspects of the disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a lidar system equipped with a GmAPD detector. Lidar systems may use high sensitivity detectors to sense obstacles in the environment of an autonomous vehicle. Such a sensitive detector can be overwhelmed by background noise that poses a challenge to signal processing algorithms. To address this, raw data sensed by a lidar GmAPD detector can be pre-conditioned to facilitate differentiating low intensity signals from background noise. By sampling raw avalanche counts accumulated by the detector as Bernoulli trials, binomial statistics can be leveraged to transform the raw data to a probability distribution, and then to a normalized data set, from which signals can be extracted and processed effectively. The photon intensity of reflected laser pulses can also be determined by modeling an exponentially decreasing histogram of reflected signals as a Poisson distribution, and integrating the distribution over the number of Bernoulli trials.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. The present solution is not limited to autonomous vehicle applications. The present solution can be used in other applications such as robotic application, radar system application, metric applications, and/or system performance applications.

Figure 1:
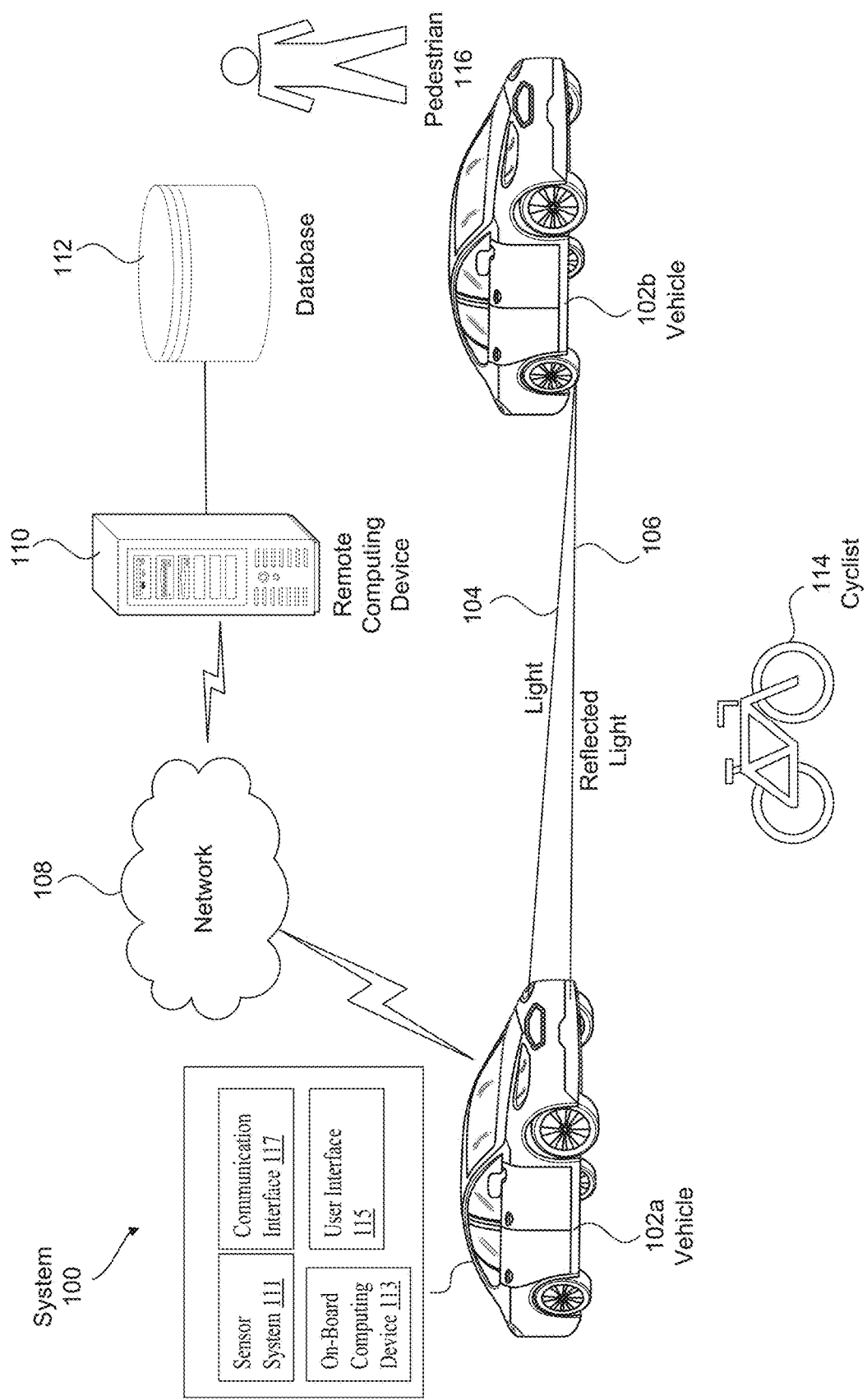
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an vehicle on-board computing device 113, a communications interface 117, and a user interface 115. Autonomous vehicle 101 may further include certain components (as illustrated, for example, in FIG. 2) included in vehicles, which may be controlled by the vehicle on-board computing device 113 using a variety of communication signals and/or commands, such as, for example, acceleration signals or commands, deceleration signals or commands, steering signals or commands, braking signals or commands, etc.

Figure 2:
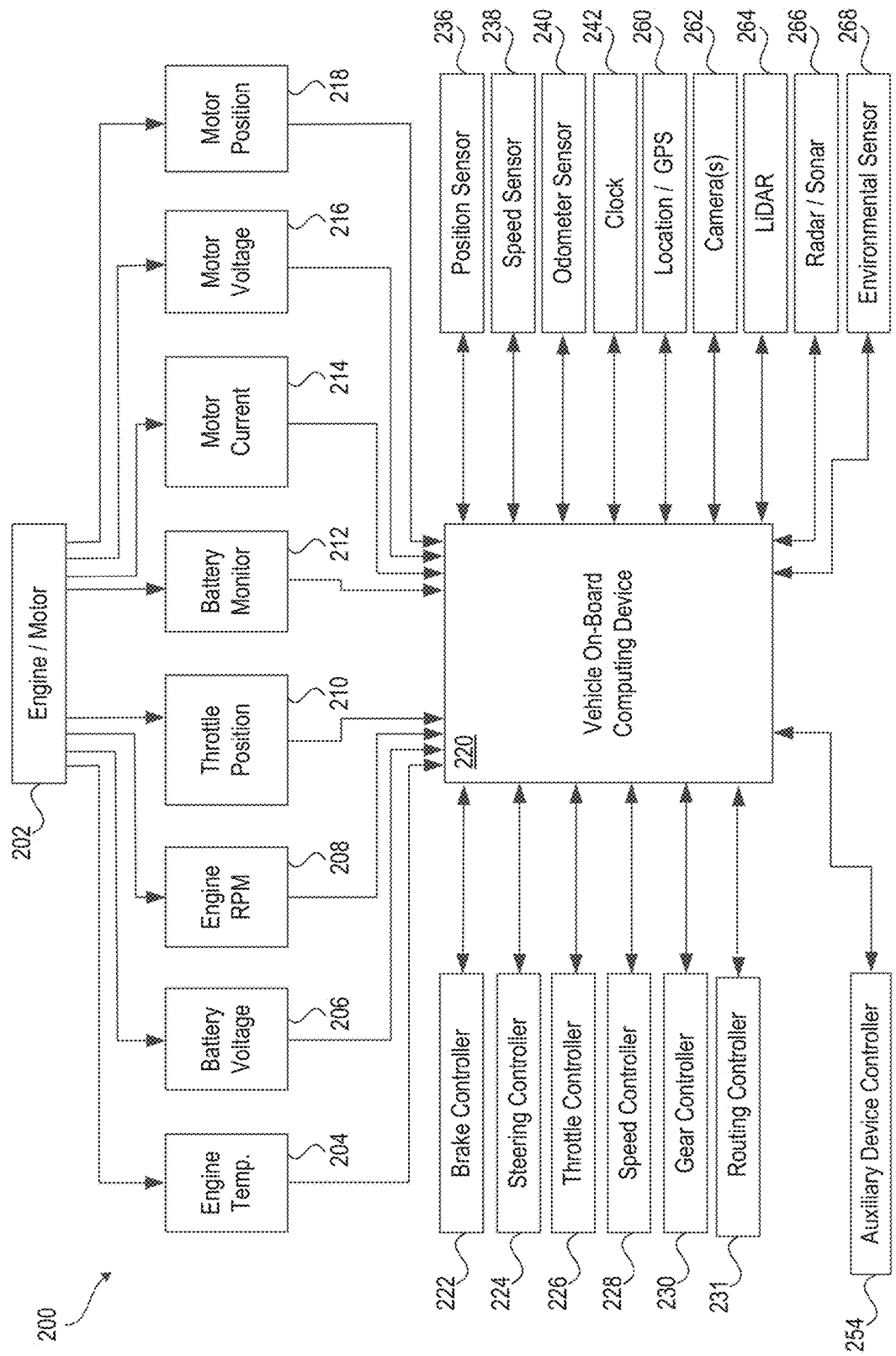
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to the vehicle on-board computing device 113. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220, e.g., the on-board computing device 113 of FIG. 1. The vehicle on-board computing device 220 may be implemented using the computer system of FIG. 17. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the vehicle on-board computing device 113, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the vehicle on-board computing device 113. The object detection information and/or captured images are processed by the vehicle on-board computing device 113 to detect objects in proximity to the vehicle 200. Any known or to be known technique for making an object detection based on sensor data and/or captured images can be used in the embodiments disclosed in this document.

Lidar information is communicated from lidar system 264 to the vehicle on-board computing device 113. Additionally, captured images are communicated from the camera(s) 262 to the vehicle on-board computing device 113. The lidar information and/or captured images are processed by the vehicle on-board computing device 113 to detect objects in proximity to the vehicle 200. The manner in which the object detections are made by the vehicle on-board computing device 113 includes such capabilities detailed in this disclosure.

The vehicle on-board computing device 113 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the vehicle on-board computing device 113 may determine perception information of the surrounding environment of the AV 102a. Based on the sensor data provided by one or more sensors and location information that is obtained, the vehicle on-board computing device 113 may determine perception information of the surrounding environment of the AV 102a. The perception information may represent what an ordinary driver would perceive in the surrounding environment of a vehicle. The perception data may include information relating to one or more objects in the environment of the AV 102a. For example, the vehicle on-board computing device 113 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The vehicle on-board computing device 113 may use any now or hereafter known object recognition algorithms, video tracking algorithms, and computer vision algorithms (e.g., track objects frame-to-frame iteratively over a number of time periods) to determine the perception.

In some embodiments, the vehicle on-board computing device 113 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The vehicle on-board computing device 113 may perform one or more prediction and/or forecasting operations. For example, the vehicle on-board computing device 113 may predict future locations, trajectories, and/or actions of one or more objects. For example, the vehicle on-board computing device 113 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the vehicle on-board computing device 113 may predict whether the object will likely move straight forward or make a turn. If the perception data indicates that the intersection has no traffic light, the vehicle on-board computing device 113 may also predict whether the vehicle may have to fully stop prior to enter the intersection.

In various embodiments, the vehicle on-board computing device 113 may determine a motion plan for the autonomous vehicle. For example, the vehicle on-board computing device 113 may determine a motion plan for the autonomous vehicle based on the perception data and/or the prediction data. Specifically, given predictions about the future locations of proximate objects and other perception data, the vehicle on-board computing device 113 can determine a motion plan for the AV 102a that best navigates the autonomous vehicle relative to the objects at their future locations.

In some embodiments, the vehicle on-board computing device 113 may receive predictions and make a decision regarding how to handle objects and/or actors in the environment of the AV 102a. For example, for a particular actor (e.g., a vehicle with a given speed, direction, turning angle, etc.), the vehicle on-board computing device 113 decides whether to overtake, yield, stop, and/or pass based on, for example, traffic conditions, map data, state of the autonomous vehicle, etc. Furthermore, the vehicle on-board computing device 113 also plans a path for the AV 102a to travel on a given route, as well as driving parameters (e.g., distance, speed, and/or turning angle). That is, for a given object, the vehicle on-board computing device 113 decides what to do with the object and determines how to do it. For example, for a given object, the vehicle on-board computing device 113 may decide to pass the object and may determine whether to pass on the left side or right side of the object (including motion parameters such as speed). The vehicle on-board computing device 113 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the vehicle on-board computing device 113 may execute one or more control instructions to perform a cautious maneuver (e.g., mildly slow down, accelerate, change lane, or swerve). In contrast, if the collision cannot be avoided, then the vehicle on-board computing device 113 may execute one or more control instructions for execution of an emergency maneuver (e.g., brake and/or change direction of travel).

As discussed above, planning and control data regarding the movement of the autonomous vehicle is generated for execution. The vehicle on-board computing device 113 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
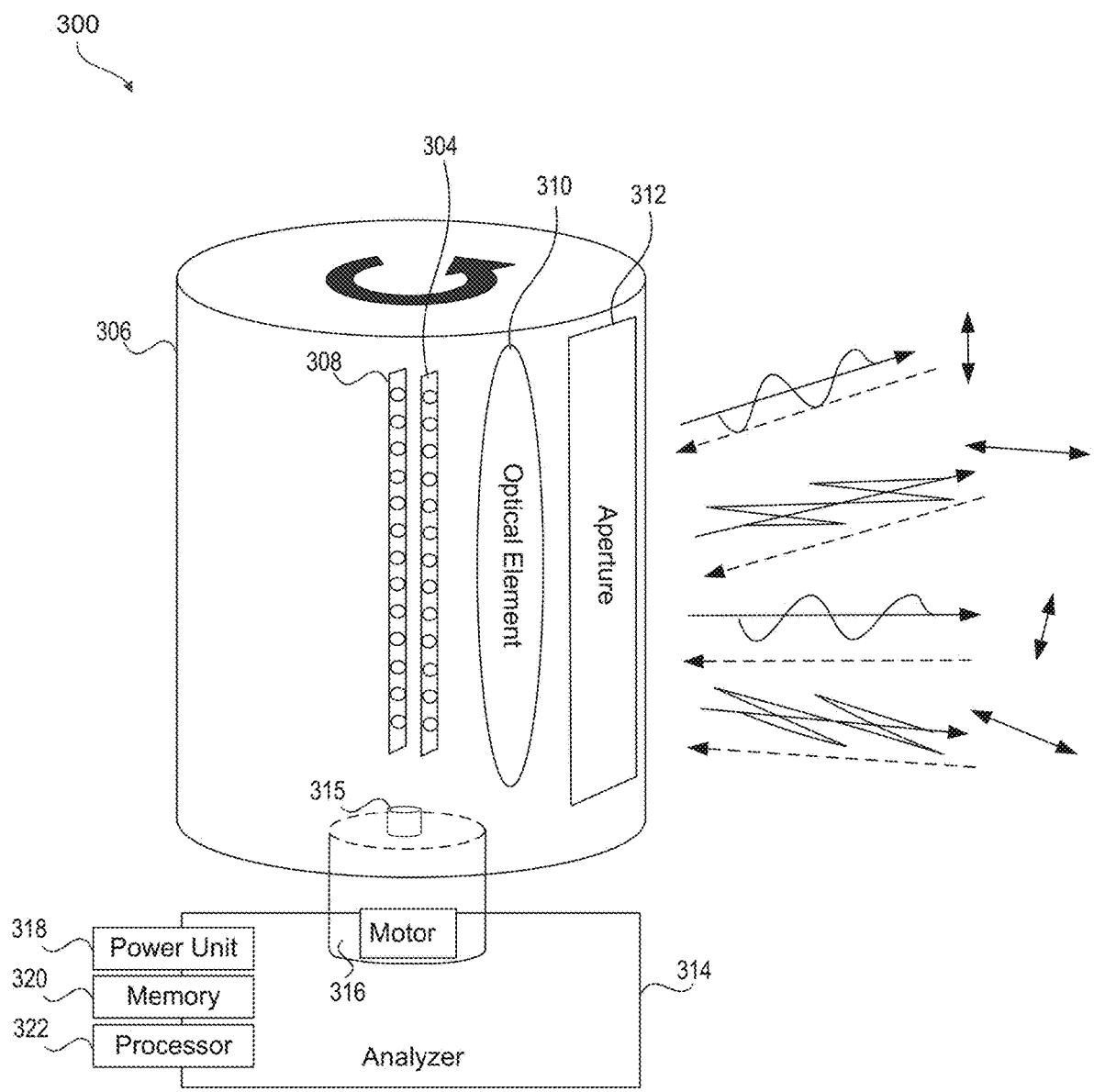
FIG. 3 illustrates an exemplary architecture for a lidar system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4B:
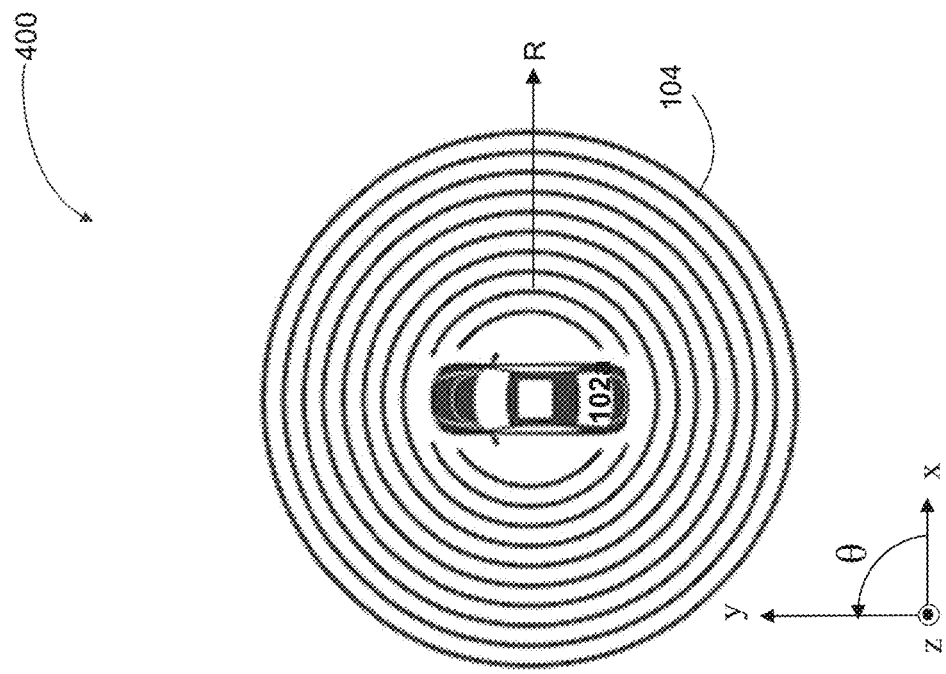
FIG. 4B is a top plan view of the autonomous vehicle shown in FIG. 4A, illustrating signals being transmitted and received by the lidar apparatus, in accordance with aspects of the disclosure.
Figure 4A:
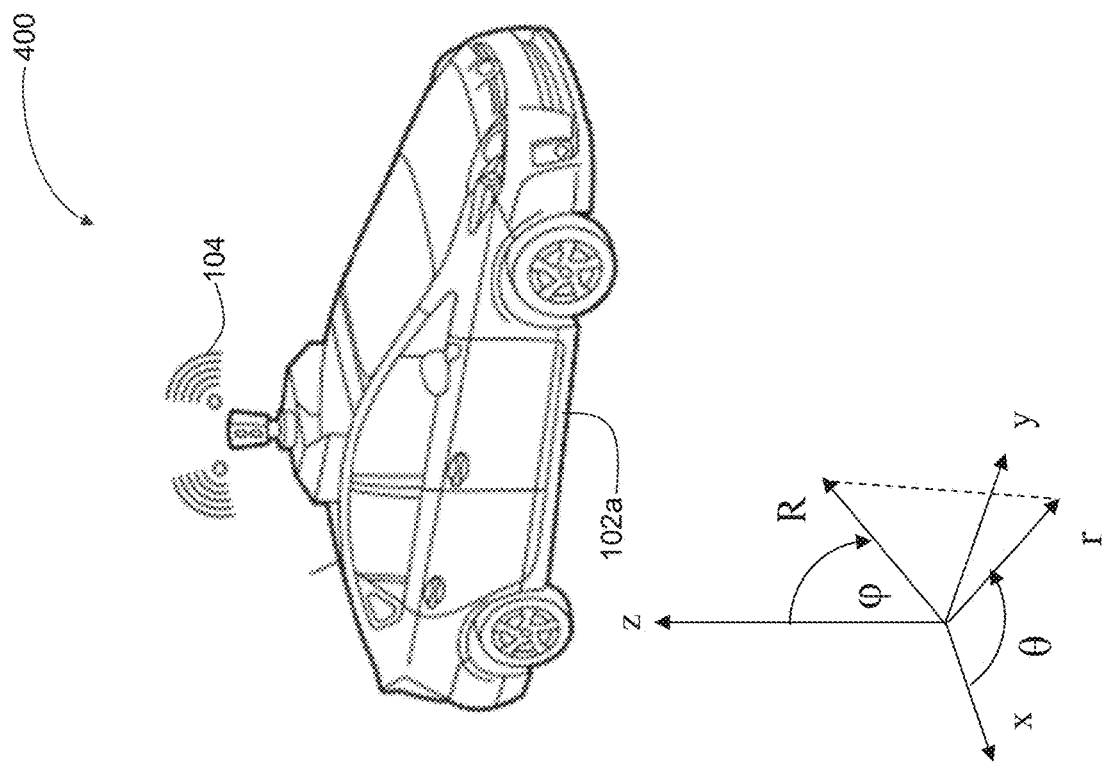
FIG. 4A is a pictorial view of an autonomous vehicle equipped with a lidar apparatus, in accordance with aspects of the disclosure.

FIGS. 4A and 4B illustrate a lidar apparatus 400, in accordance with aspects of the disclosure. In some embodiments, lidar apparatus 400 is attached to an autonomous vehicle (AV) 102a, or driverless car. Lidar apparatus 400 can be attached to the roof of AV 102a, for a clear line of sight from which to emit and detect laser signals 104, e.g., laser beams.

Referring to FIG. 4B, a laser beam can be swept through selected ranges of azimuthal angle θ and elevation angle φ, so as to propagate laser signals 104 radially outward from the transmitter of lidar apparatus 400, to reflect from objects in the vicinity of AV 102a. For example, when lidar apparatus 400 is mounted to the roof of AV 102a as shown in FIG. 4A, the laser beam can be swept through all 360 degrees of azimuthal angle θ while being swept through only 45 degrees of elevation angle φ. As AV 102a travels through its environment, lidar apparatus 400 can be used, alone, or in conjunction with other devices such as cameras, to determine distances of various objects in the environment, relative to the vehicle 102. Objects of interest in the environment of AV 102a include, for example, buildings, trees, other vehicles, pedestrians, and traffic lights, which are generally located at, or slightly above, ground level.

The use of techniques disclosed herein within the example lidar apparatus 400 may serve to enhance the ability of lidar apparatus 400 to perform range determinations. It is noted that, although the lidar apparatus 400 is depicted in FIG. 4A as being incorporated into AV 102a, and having features as described herein, lidar apparatus 400 may also be implemented in other contexts. Furthermore, techniques described herein that are applied to lidar apparatus 400, e.g., data normalization using Bernoulli trials and binomial confidence estimation, may be used outside of the lidar context as well.

Figure 5:
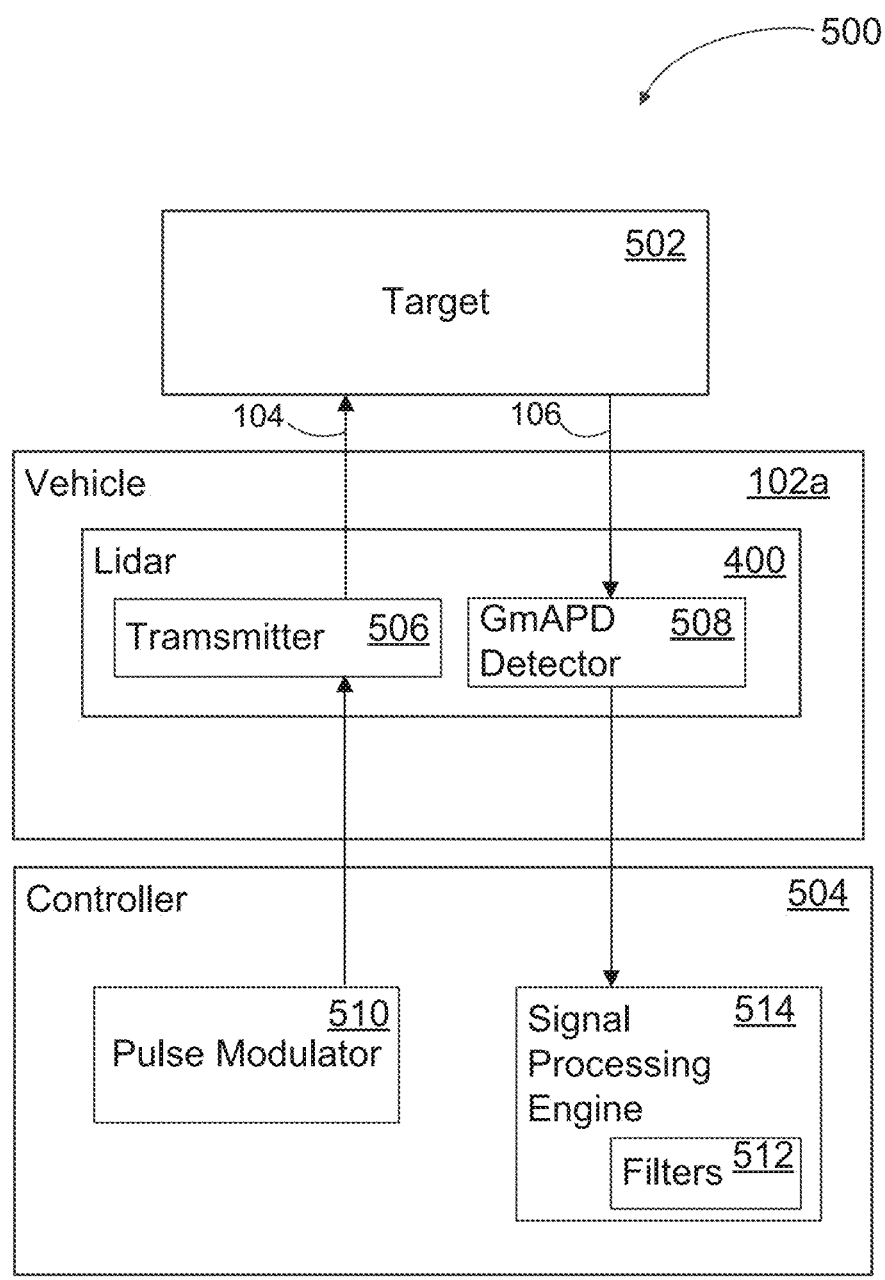
FIG. 5 is a block diagram of a system for operating the lidar apparatus shown in FIGS. 4A-4B, in accordance with aspects of the disclosure.

FIG. 5 shows a lidar system 500 for operating lidar apparatus 400 to distinguish low intensity signals reflected from a target 502 from background noise, in accordance with aspects of the disclosure. Lidar system 500 includes lidar apparatus 400, illustrated in FIGS. 4A and 4B, and a controller 504 coupled to lidar apparatus 400. In some embodiments, lidar apparatus 400 is mounted on vehicle 102a. Lidar apparatus 400 can include a transmitter 506 and a detector 508. In some embodiments, transmitter 506 is a pulsed laser source configured to transmit laser beam pulses in a radial pattern as shown in FIG. 4B, provided by a pulse modulator 510.

In some embodiments, detector 508 is configured to detect laser pulse reflections from target 502 using a single photon type of detector 508, e.g., a GmAPD detector, that indicates whether or not one or more photons has been received. Single photon detectors are not sensitive to the number of photons in the reflected pulse. Instead, single photon detectors act as digital optical switches that simply indicate whether or not one or more photons have been received.

In some embodiments, controller 504 includes filters 512 and a signal processing engine 514 that cooperate to perform signal processing operations on signals from GmAPD detector 508. Controller 504 may be programmed to implement method 600 via signal processing engine 514 as described below. Pulse modulator 510, filters 512, and signal processing engine 514 can be implemented in hardware (e.g., using application specific integrated circuits (ASICs)) or in software, or combinations thereof.

Figure 6:
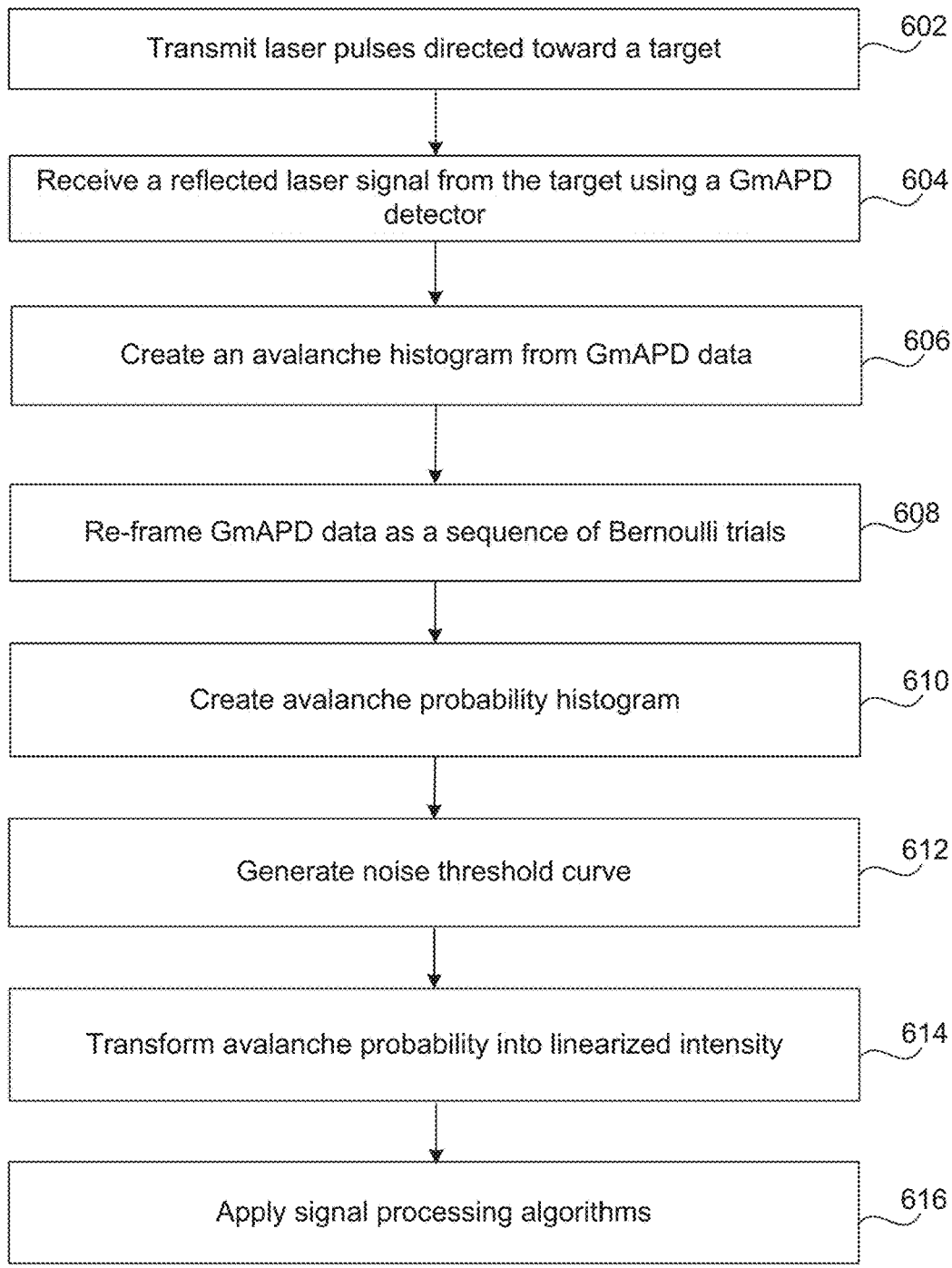
FIG. 6 is a flow diagram of a method of processing reflected laser signals from the lidar apparatus shown in FIGS. 3-5, in accordance with aspects of the disclosure.

FIG. 6 illustrates a method 600 that transforms raw GmAPD data to facilitate robust statistical signal processing and photonic intensity estimation, in accordance with aspects of the disclosure. FIG. 6 is described with continued reference to the elements of FIG. 5. Method 600 involves reframing each raw GmAPD data point as a time series of independent Bernoulli trials, starting from when GmAPD detector 508 is armed, and ending when GmAPD detector 508 is disarmed. Method 600 transforms sensor data in the form of avalanche counts into units of avalanche probability and photonic intensity, in preparation for determining an intensity level of reflected laser signal 106. Method 600 also conditions sensor data to facilitate extracting signals from background noise.

Referring to FIG. 6, at operation 602, a laser pulse 104 is transmitted by lidar transmitter 506, and is directed toward target 502 as illustrated in FIGS. 1, 4, and 5.

Figure 7:
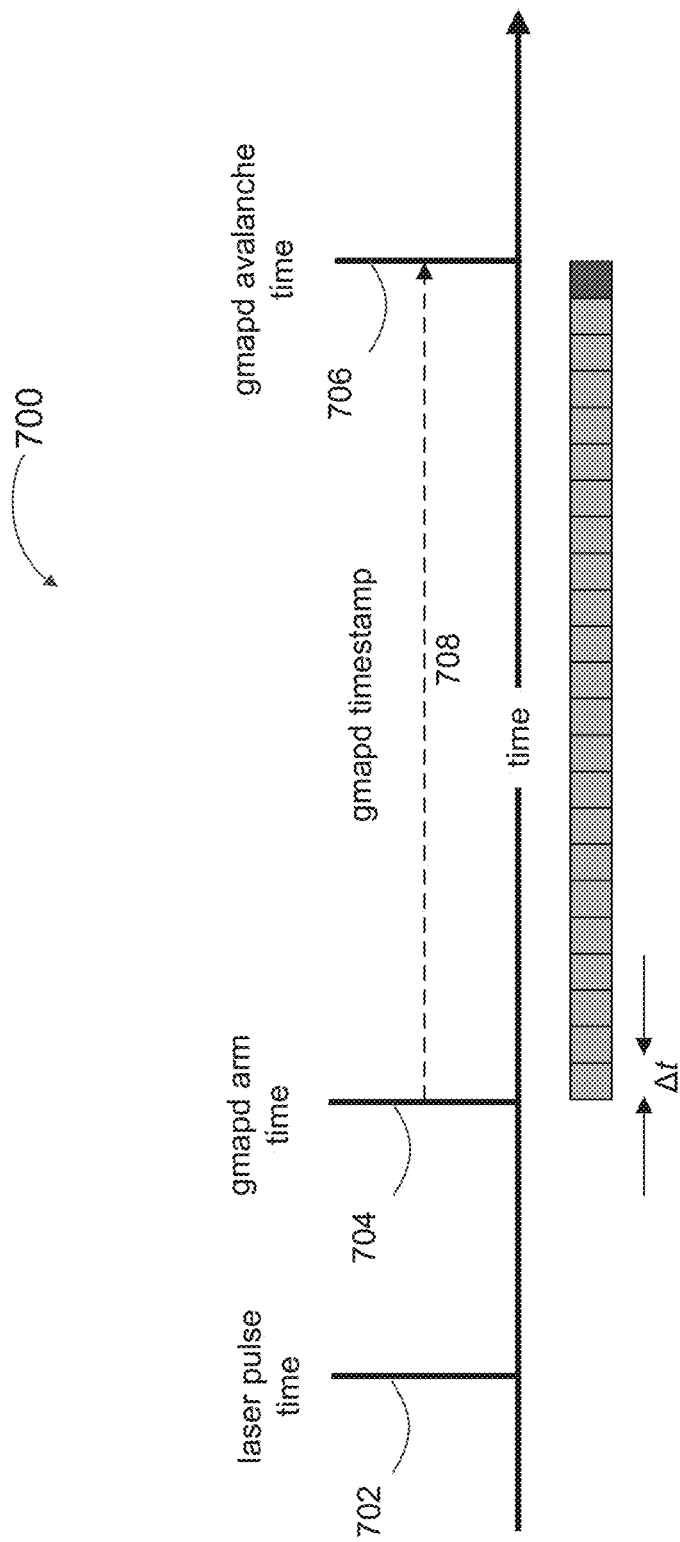
FIG. 7 is a lidar signal timing diagram, in accordance with aspects of the disclosure.

Referring to FIG. 6, at operation 604, reflected laser signal 106 is received from target 502 by GmAPD detector 508, as shown in FIGS. 5 and 7, in accordance with aspects of the disclosure. Exemplary timing diagram 700 illustrates events related to acquiring a single raw GmAPD data point, in accordance with aspects of the disclosure. At time 702, a laser pulse is emitted and propagates toward a target. At time 704, GmAPD detector 508 is armed, or activated for photon detection. At time 706, a photon is incident on GmAPD detector 508, causing an avalanche breakdown event to occur in the photodiode. In response, a timestamp 708 associated with the photon detection event is recorded. Timestamp 708 is the time interval between time 704 and time 706. Following the detection event at time 706, GmAPD detector 508 disarms for a period of time to allow charge to dissipate from the detector.

In some embodiments, GmAPD detector 508 includes a data readout circuit configured to return multiple avalanche timestamps 708 per laser pulse 104. In some embodiments GmAPD detector 508 includes a data readout circuit configured with a minimum hold-off time between avalanche time 706 and the next arm time 704 that can be set by the user. When input data contains multiple avalanche timestamps per pulse, the treatment of timestamps is slightly different, whereas a conventional coincidence processing algorithm may struggle to handle data from a sensor with multiple timestamps per pulse because (re)arm positions can be scattered throughout the range gate.

Figure 8:
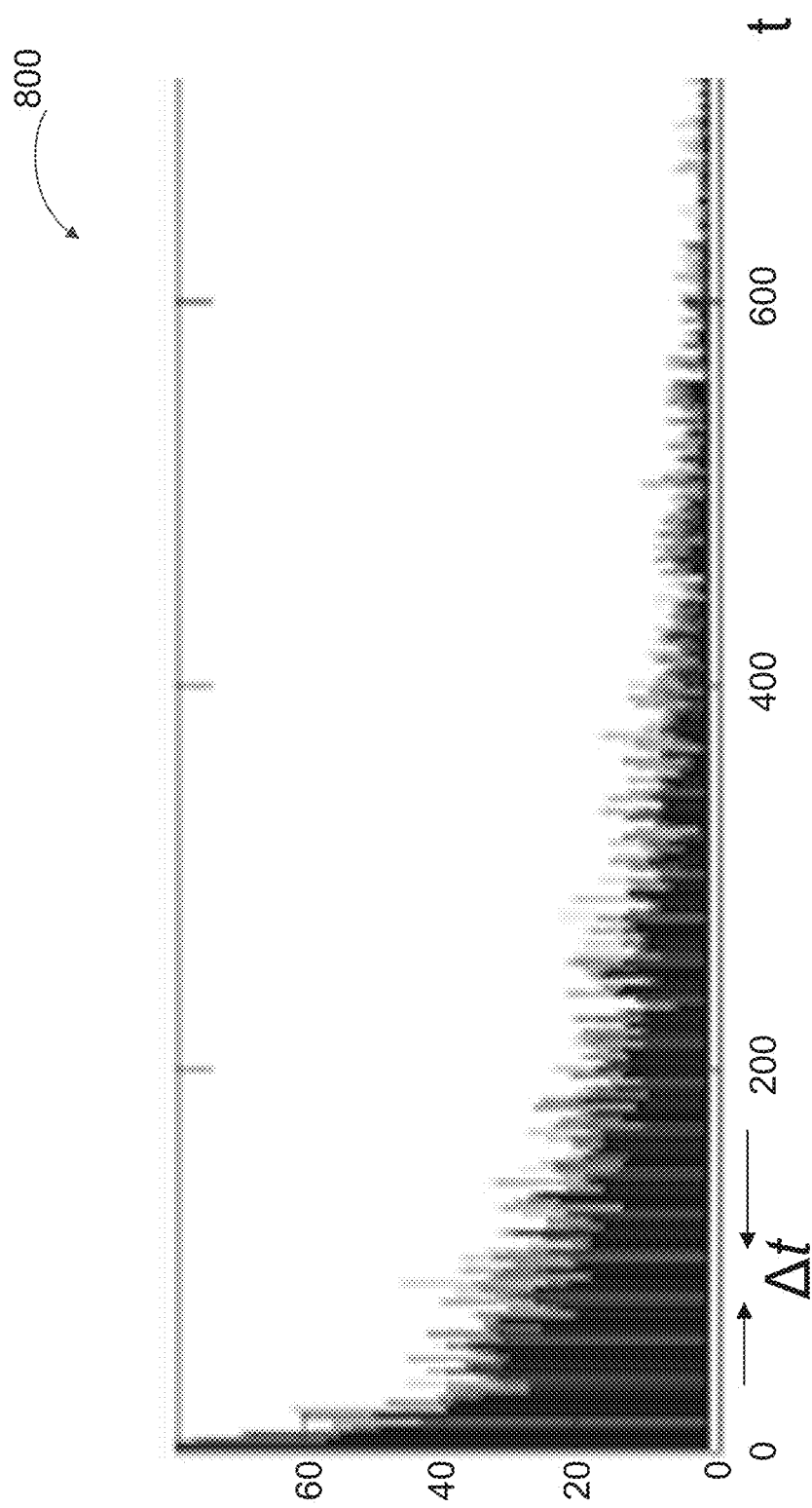
FIG. 8 is a lidar signal diagram illustrating an avalanche histogram created from detector data, in accordance with aspects of the disclosure.

Referring to FIG. 6, at operation 606, an avalanche counts histogram 800 is created from GmAPD data, as shown in FIG. 8, in accordance with aspects of the disclosure. Avalanche counts histogram 800 is a graph of the number of counts, or photon detections per unit time, starting when GmAPD detector 508 is armed at 704, and ending when GmAPD detector 508 is disarmed after time 706. When GmAPD detector 508 is armed, it reacts to every light signal, but over time the detector becomes saturated. Thus, GmAPD detector 508 exhibits a decreasing exponential response. Then GmAPD detector 508 is dis-armed, re-armed, and, upon sensing another photon, exhibits another decreasing exponential response.

Figure 9:
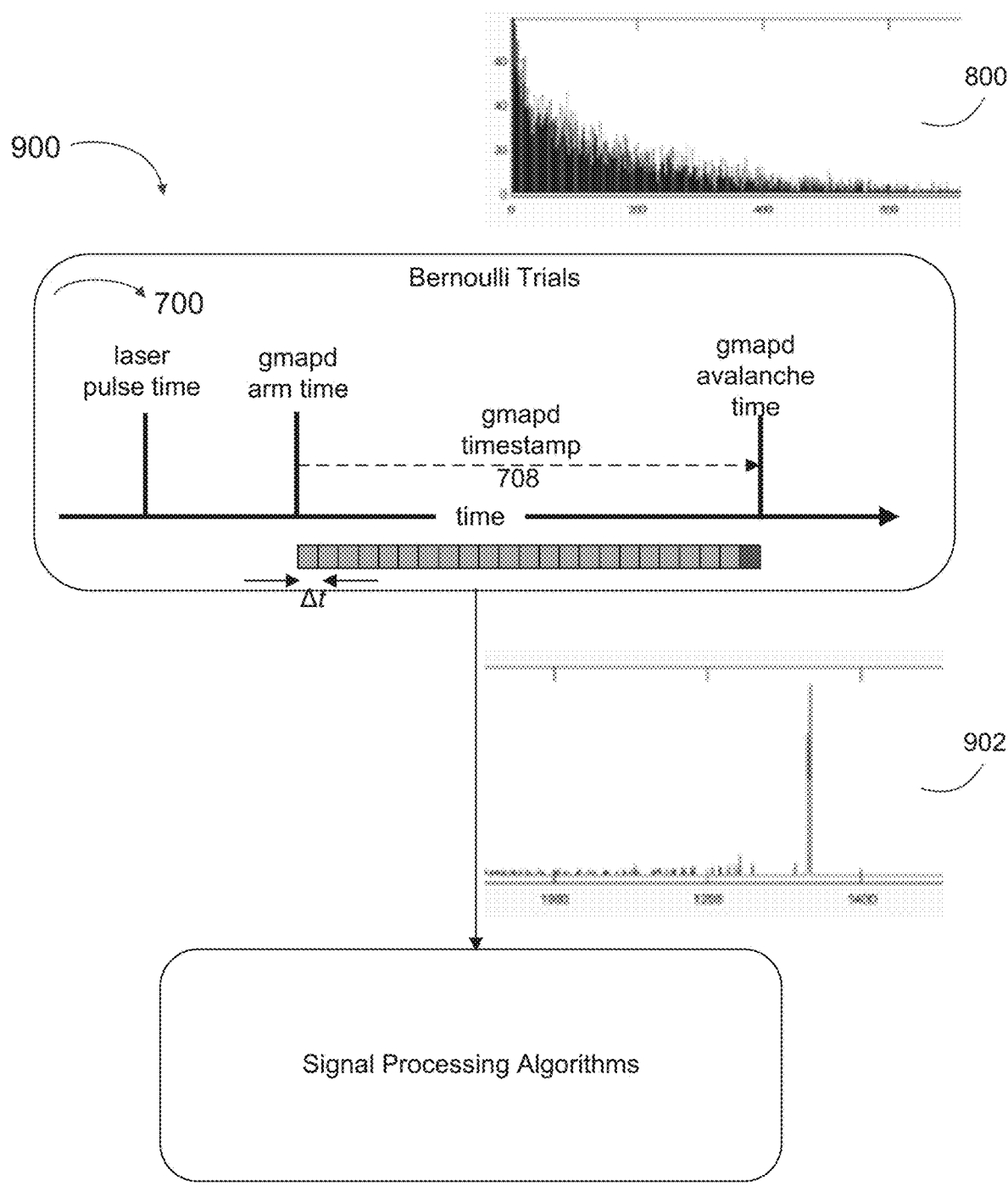
FIG. 9 is detailed flow diagram of a subset of steps shown in FIG. 6, in accordance with aspects of the disclosure.
Figure 10A:
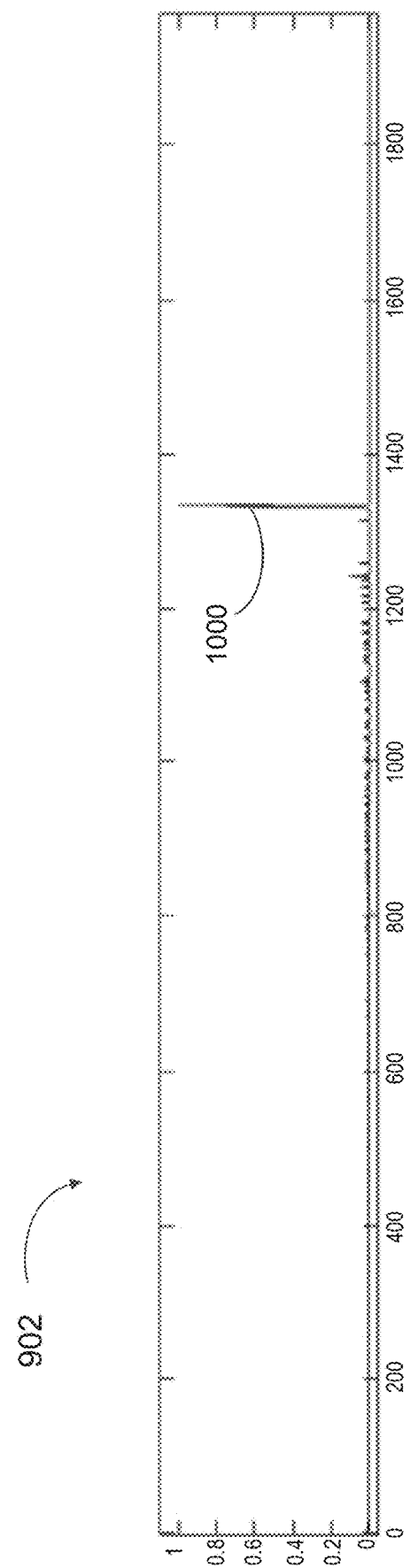
FIG. 10A shows an avalanche probability histogram, in accordance with aspects of the disclosure.

Referring to FIG. 6, at operation 608, GmAPD histogram data can be re-framed as a sequence of Bernoulli trials, as shown in FIGS. 9 and 10A, in accordance with aspects of the disclosure. Using this technique, the avalanche counts histogram 800 can be converted to a corresponding avalanche probability histogram 902. Avalanche counts histogram 800 can be re-framed in the context of a series of Bernoulli trials by considering each time bin $\Delta t$ in histogram 800, within timestamp 708, as an independent Bernoulli trial with a binary outcome of either a photon detection or "no event." If no avalanche event occurs within the time interval associated with timestamp 708, all of the Bernoulli trials in the series are counted as "no event." The technique applied at operation 608 can be considered as being analogous to an analog-to-digital converter that samples the avalanche counts histogram 800 as an input, and converts each time bin to either a signal (1) or noise (0). When a signal threshold is set at zero, any non-zero detection is interpreted as a signal. The output of operation 608 is an avalanche probability histogram 902, shown enlarged in FIG. 10A, exhibiting a strong signal 1000.

Figure 10B:
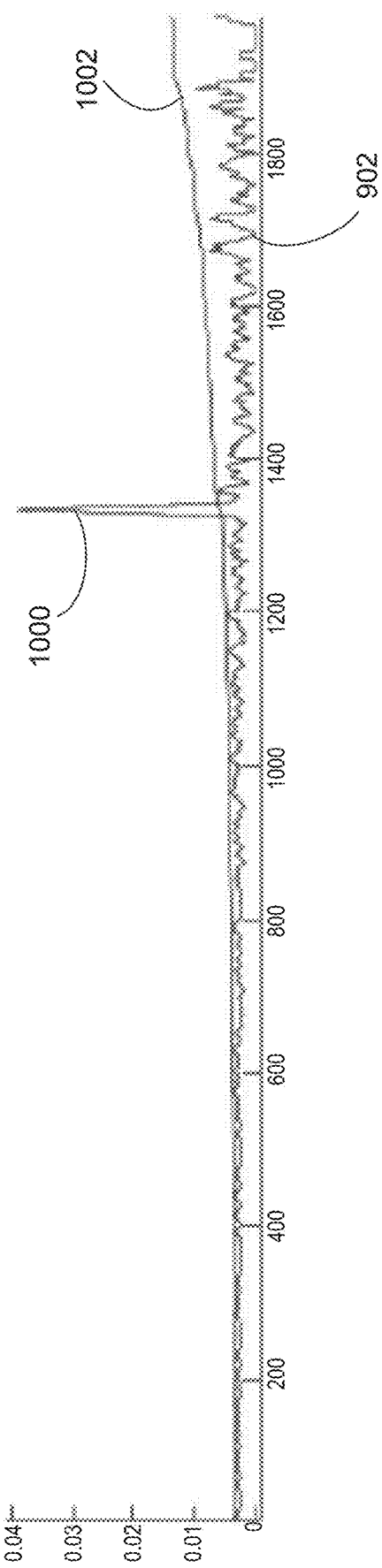
FIG. 10B shows a noise threshold curve superimposed on the avalanche probability histogram shown in FIG. 10A, in accordance with aspects of the disclosure.

Referring to FIG. 6, at operation 612, a noise threshold curve 1002 can be superimposed on the avalanche probability histogram 902 as shown in FIG. 10B, in accordance with aspects of the disclosure. A noise threshold level can be derived from the avalanche probability p and an estimated background noise probability $p_n$, according to an approximate binomial confidence interval, e.g., the Wald Interval, given by $$Z=(p-p_n)/\text{sqrt}(p(1-p)/n), \quad (1)$$

for a sufficiently large value of n, where n is the number of Bernoulli trials. When the user specifies a minimum confidence threshold, the confidence level Z can be converted into avalanche, probability, or intensity units to superimpose a noise threshold level on top of the corresponding histogram. In the example shown in FIG. 10B, the tunable noise threshold curve 1002 was derived from the Wald Interval with a 3.1σ confidence threshold. Alternatively, another approximate binomial confidence interval may be used to calculate noise threshold curve 1002, e.g., the Wilson Score Interval, given by $$Z=(p-p_n)/\text{sqrt}(p_n(1-p_n)/n). \quad (2)$$

Referring to FIG. 6, at operation 614, avalanche probability histogram 902 can be transformed into a linearized intensity histogram, in accordance with aspects of the disclosure. Examples of such a transformation are shown in FIGS. 11A-11B and 12A—12B. A number of incident photons can then be calculated from the linearized intensity histogram using equations (3) and (4) as explained below.

Figure 11B:
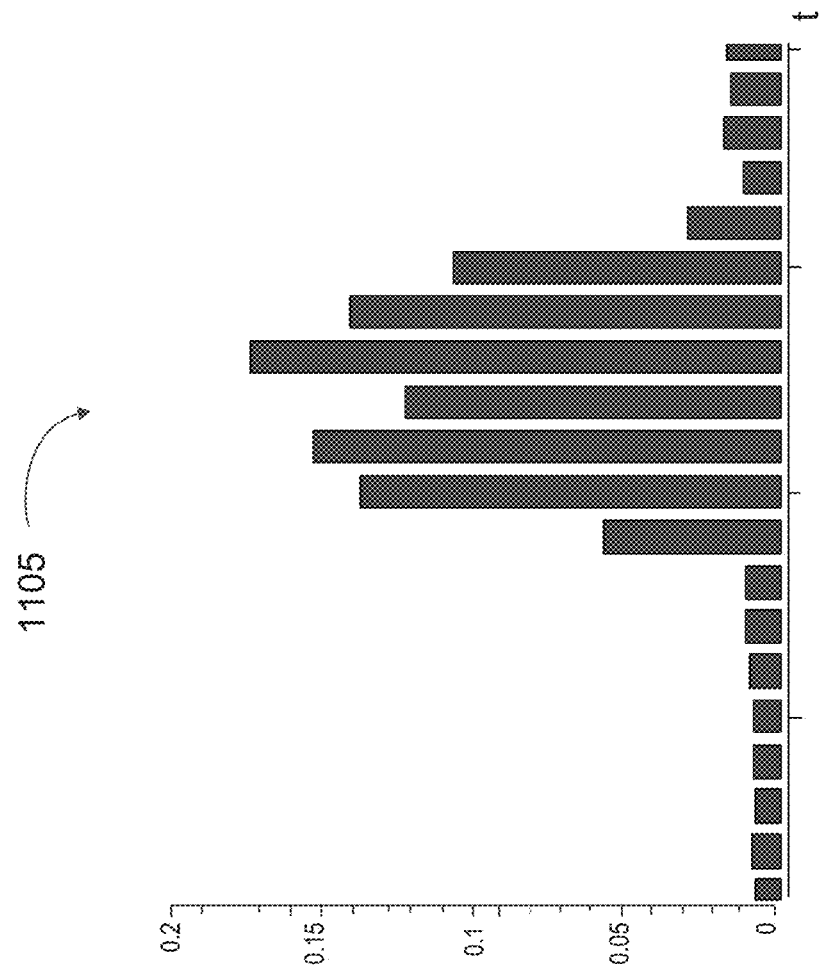

The histogram transformation shown in FIGS. 11A-11B and FIGS. 12A-12B also illustrate a technique for correcting "range walk," which is an effect in GmAPD lidar data that causes high intensity reflected laser signals 106 to appear at closer range than lower intensity reflected laser signals 106. Multiple factors can exacerbate range walk, but one of the primary causes is waveform distortion due to pile-up of avalanches at the rising edge of the waveform, blocking Bernoulli trials from sampling the falling edge of the waveform. For example, FIG. 11A shows an avalanche probability histogram 1100 from a low reflectance target. Avalanche probability histogram 1100 is distorted by range walk, affecting the circled bins 1110 at the rising edge of the waveform. FIG. 11B shows a linearized intensity histogram 1105 of the same waveform in which the distortion has been corrected and the waveform has been fully recovered.

Figure 12B:
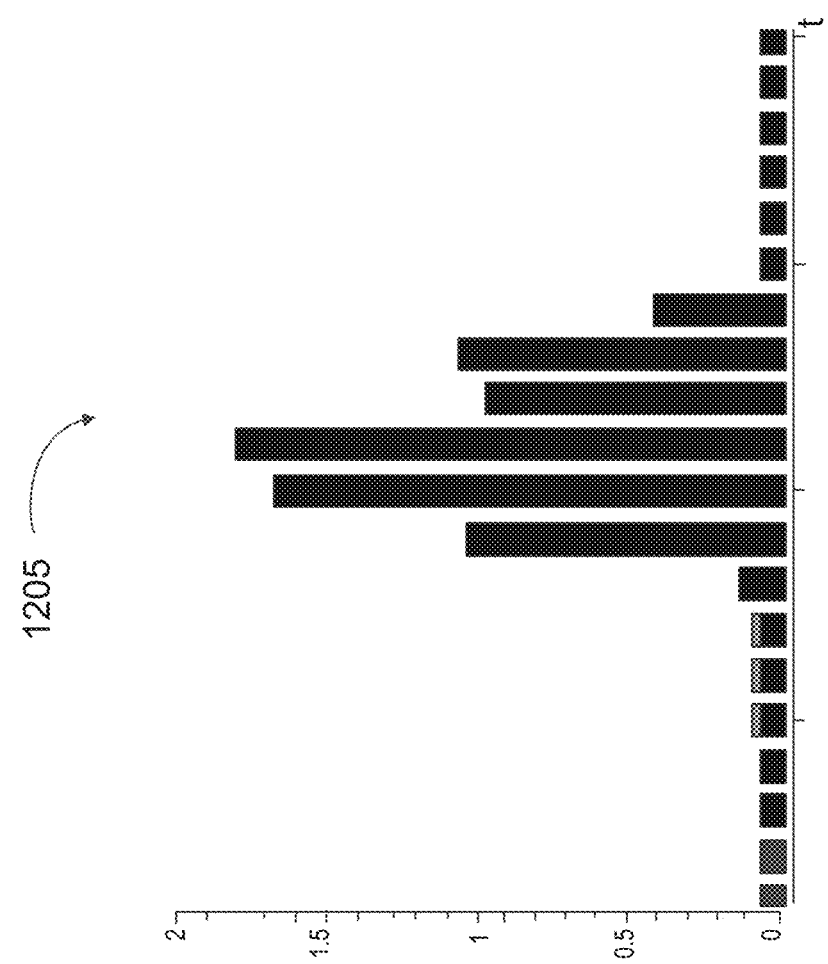

FIG. 12A shows an avalanche probability histogram 1200 for a high reflectance target. Avalanche probability histogram 1200 is also distorted by range walk, affecting the circled bins 1210 at the rising edge of the waveform. Avalanche probability histogram 1200 appears very narrow due to avalanche pileup. FIG. 12B shows a linearized intensity histogram 1205 of the same waveform, in which the distortion has been corrected and the waveform has been partially recovered. However, the width of linearized intensity histogram 1205 is still narrower than expected due to both saturation and intensity dependent impulse response characteristics of the detector.

As long as reflected laser signal 106 does not completely saturate GmAPD detector 508 at the rising edge, the avalanche pileup effect can be partially corrected by transforming the GmAPD data into intensity units. The waveform may also be distorted due to intensity dependent impulse response characteristics of GmAPD detector 508, which may not be fully correctable using Bernoulli trial data normalization techniques alone.

A determination of the intensity of reflected laser signal 106, can be made with reference again to FIG. 8. The avalanche counts histogram 800 shown in FIG. 8 shows an exponentially decreasing function—that is, the number of photon counts decreases exponentially with time. This behavior indicates that the probability of detection of an avalanche event occurring in any given time period when GmAPD detector 508 is active can also be expressed as an exponentially decreasing function, e.g., a Poisson distribution, $P(t)=\lambda e^{-\lambda t}$ dt, where $\lambda$ is the rate of exponential decrease. The cumulative probability of detection within a time interval $\Delta t$ is then given by the integral of $P(t)$, or $P(\Delta t)=1-e^{-\lambda \Delta t}$. Once the rate of decrease, or photon count rate, $\lambda$ is determined from the histogram data, the incident photon flux rate, $\lambda_{ph}$, can be determined by adjusting $\lambda$ according to the relationship $$\lambda_{ph}=(\lambda-DCR)/PDE, \quad (3)$$

where DCR is the intrinsic dark count rate, or false detection rate, associated with GmAPD detector 508, and PDE is the photon detection efficiency of GmAPD detector 508. The DCR and PDE are characteristics of GmAPD detector 508 that may be affected by various operational factors, such as reset time (dead time) intervals, temporal sampling schemes, and target reflectivity. Consequently, the DCR and PDE may be determined by calibrating GmAPD detector 508. Once the incident photon flux rate $\lambda_{ph}$ is known, the number of incident photons during one time bin is given by $N_{ph}=\lambda_{ph} \Delta t$. When a laser pulse spans more than one time bin, the total number of incident photons is given by integrating over multiple time bins, or $$N_{ph}=\int \lambda_{ph} * dt \quad (4)$$

In some embodiments, adjacent Bernoulli trials may be merged with one another, which can be useful for both intensity and confidence estimation when the return signal is wider than a single bin. An average count rate $\lambda_\mu$ can be calculated from the ratio of the sum of the total number of avalanche counts, $N_{avalanches}$, and total number of trials, $N_{trials}$, in all of the time bins containing the waveform:

$$\text{Average Count Rate}: \lambda_\mu = -\ln\left(1 - \frac{\sum_{i=0}^{n} N_{avalanches}(i)}{\sum_{i=0}^{n} N_{trials}(i)}\right) \bigg/ \sum_{i=0}^{n} dt(i) \quad (5)$$

The average photon flux rate can then be calculated by substituting the average count rate for $\lambda$ in equation (3), $\lambda_{ph}=(\lambda_\mu-DCR)/PDE$, and the total number of photons can be calculated according to equation (4), as $N_{ph}=\lambda_{ph}*\Sigma dt(i)$. In either case, the dynamic range and the uncertainty of the intensity measurement are dependent on the number, n, of Bernoulli trials. When the waveform is not saturated, the total number of photons calculated using either method will be approximately the same. When the waveform is saturated, an accurate intensity estimate may require more advanced waveform analysis techniques.

Referring to FIG. 6, at operation 616, signal processing algorithms can more effectively extract signals from normalized binomial confidence histogram data obtained using the techniques described above, in accordance with aspects of the disclosure. FIGS. 13A-16A illustrate four examples of avalanche counts histograms used in traditional coincidence processing (un-normalized), for comparison with FIGS. 13B-16B, illustrating corresponding normalized binomial confidence histograms.

Figures 13A, 13B:
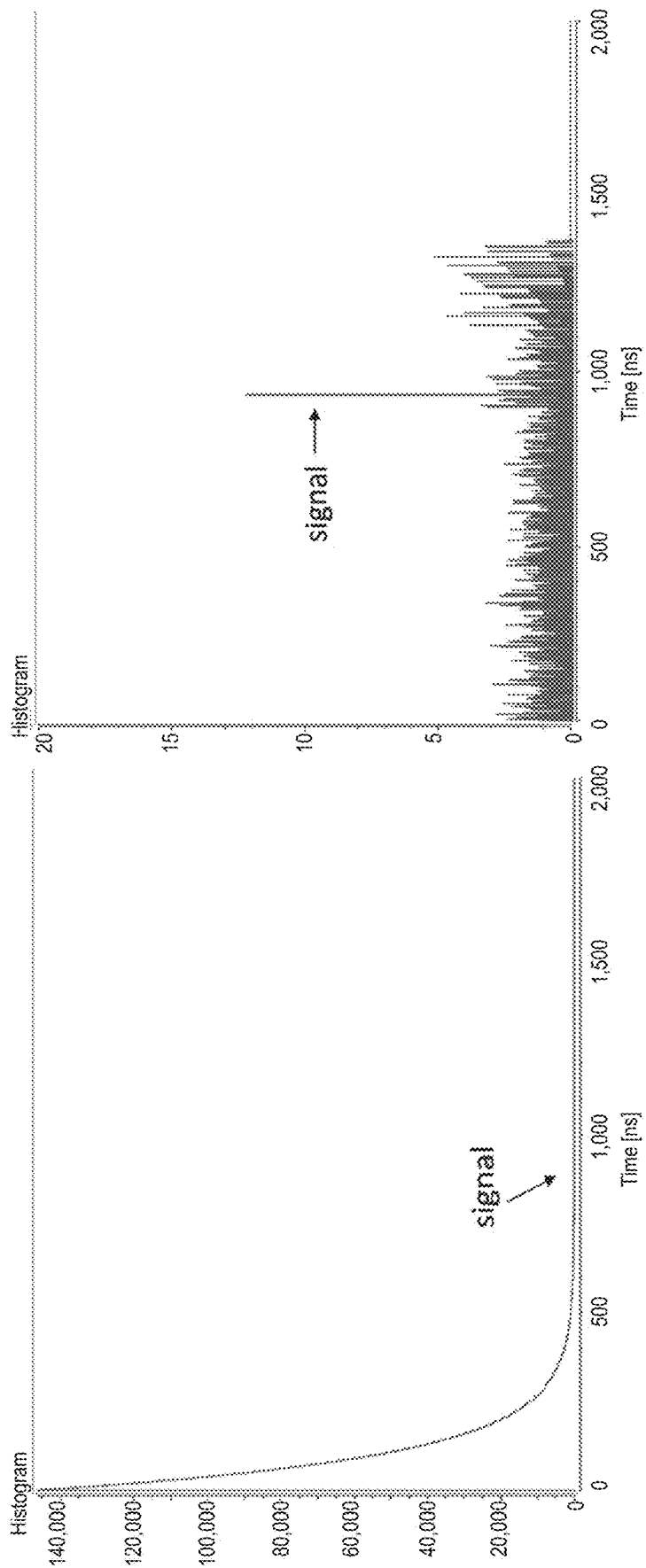
FIGS. 13A-13B show a first example of histograms before and after normalization, in accordance with aspects of the disclosure.

Referring to FIGS. 13A and 13B, un-normalized and normalized histograms, respectively, are shown for a simulated low intensity lidar signal having a high noise rate, in which GmAPD detector 508 is armed once at time zero, and not re-armed. Because the detector is not re-armed, the histograms integrate more than a million laser pulses that exponentially decay over time. The effect of the normalization process performed on the avalanche histogram data, according to operations 608-614 as described above, amplifies the signal by about a factor of four, compared with the noise level, thus allowing filters 512 to extract the signal from the high noise level.

Figures 14A, 14B:
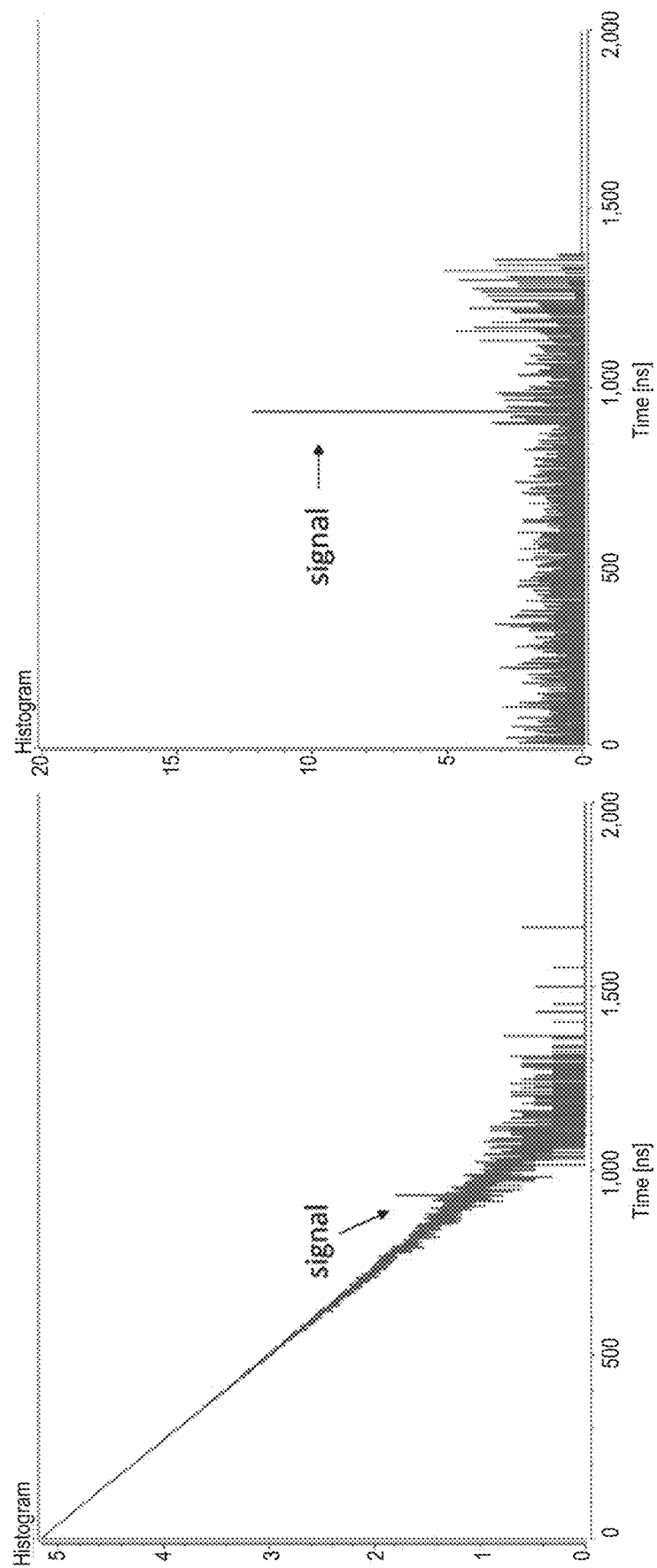
FIGS. 14A-14B show a second example of histograms before and after normalization, in accordance with aspects of the disclosure.

Referring to FIGS. 14A and 14B, the same example is shown as in FIGS. 13A and 13B, but the avalanche counts histogram of FIG. 13A is plotted on a log scale in FIG. 14A. Without the benefit of the normalization process, traditional coincidence processing can highlight the signal by taking the log of the raw avalanche count data, which decays exponentially, and fitting the resulting log data to a straight line. While this technique allows the signal to be detected without normalization, the signal is less prominent than with the corresponding amplification achieved through normalization using Bernoulli trials and binomial statistics.

Figures 15A, 15B:
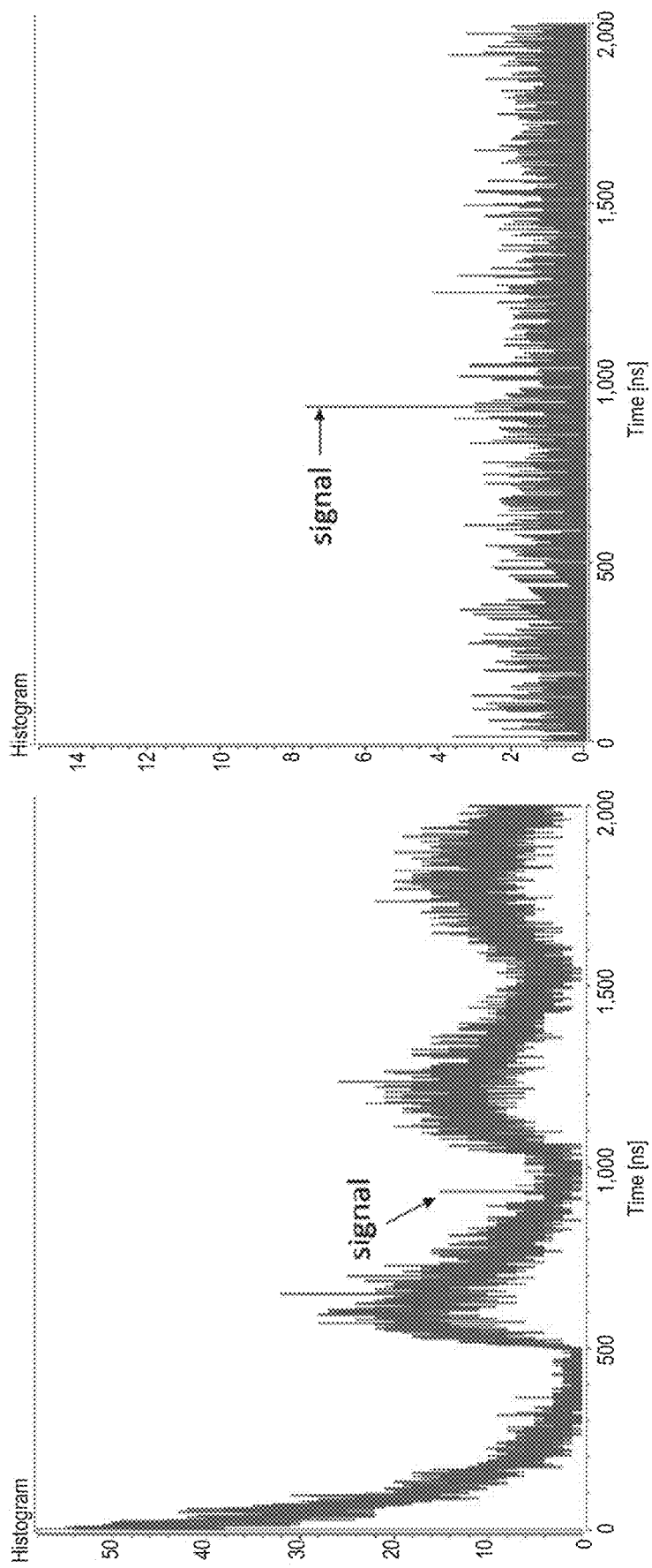
FIGS. 15A-15B show a third example of histograms before and after normalization, in accordance with aspects of the disclosure.

Referring to FIGS. 15A and 15B, a similar low intensity, high noise rate example is shown as in FIGS. 13A-13B, except that GmAPD detector 508 is re-armed three times with a 500 ns delay. The re-arming produces an avalanche counts histogram shown in FIG. 15A, for which a convolution of four exponential avalanche distributions exhibits three additional peaks corresponding to each time the detector re-arms. The presence of multiple peaks tends to obscure the signal. Whereas, using normalization suppresses the multiple peaks, and amplifies the signal by about 2.5 times the noise level (or equivalently, filters out the noise relative to the signal), allowing signal processing algorithms to extract the signal from the data shown in FIG. 15B.

Figures 16A, 16B:
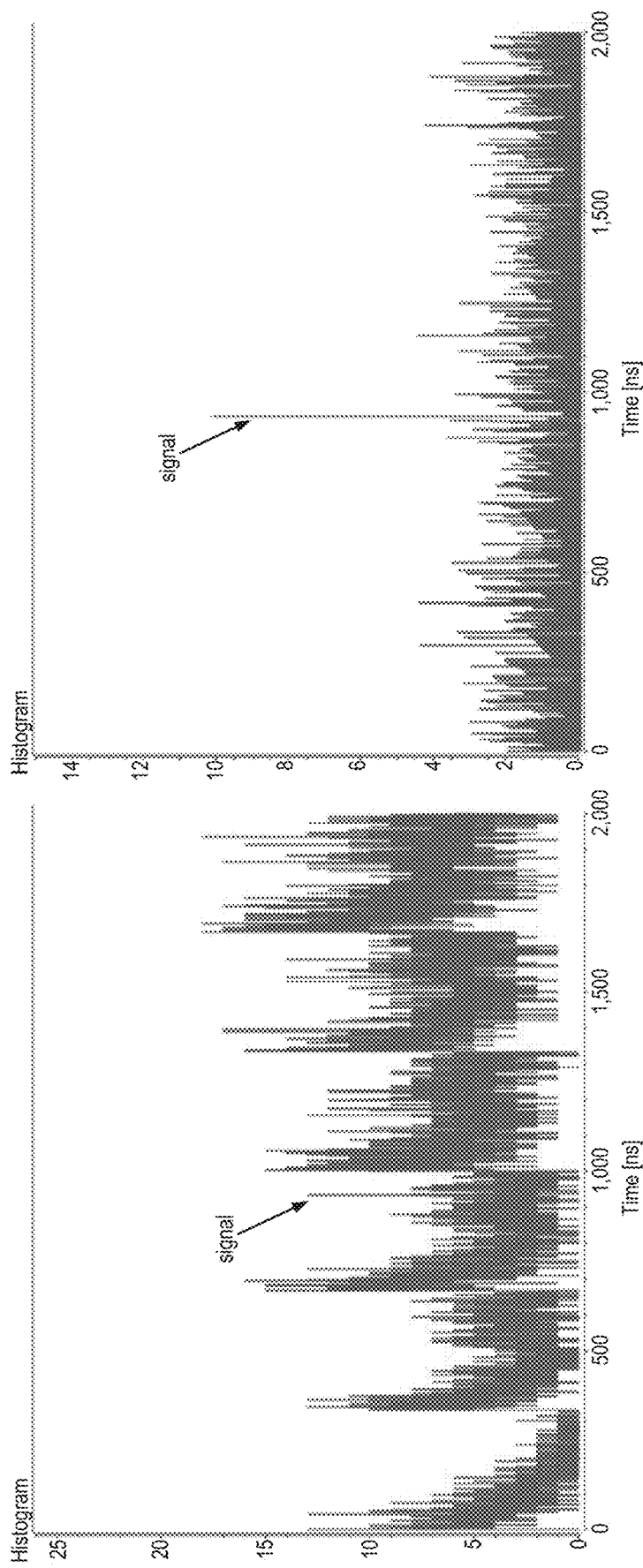
FIGS. 16A-16B show a fourth example of histograms before and after normalization, in accordance with aspects of the disclosure.

Referring to FIGS. 16A and 16B, a similar low intensity, high noise rate example with three re-arms (500 ns delay) is shown as in FIGS. 15A-15B, except that GmAPD detector 508 is coded throughout the range gate at seven different positions. The distributed coding produces an avalanche counts histogram shown in FIG. 16A, for which a convolution of ten exponential avalanche distributions exhibits multiple peaks that obscure the signal, posing a challenge for subsequent signal processing operations. Again, using normalization suppresses the peaks, and amplifies the signal by about four times, relative to the noise level, as shown in FIG. 16B.

Figure 17:
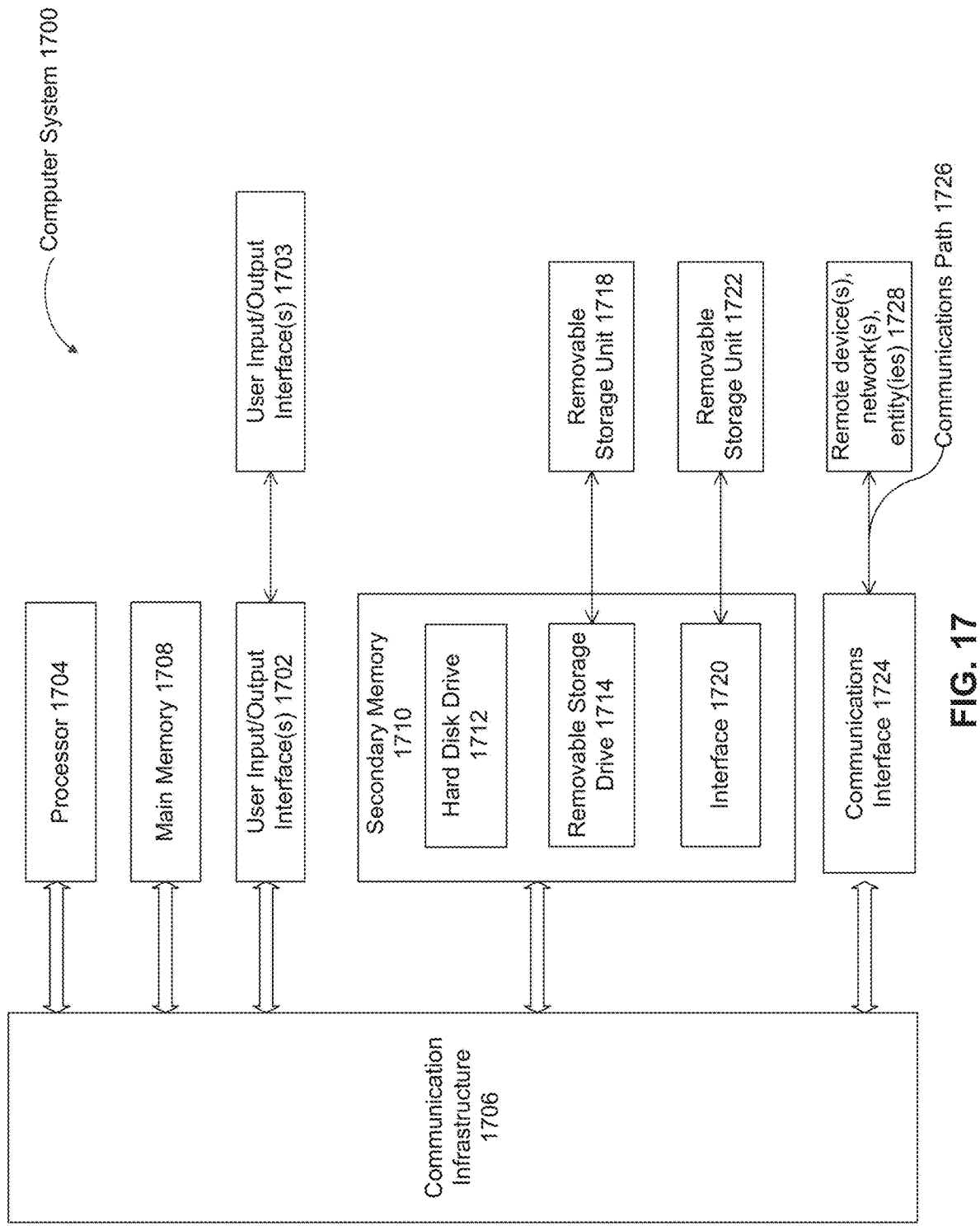
FIG. 17 is a block diagram of a controller for use with the lidar apparatus shown in FIG. 4, in accordance with aspects of the disclosure.

FIG. 17 illustrates an example computer system 1700 in which various embodiments of the present disclosure can be implemented. Computer system 1700 can be any well-known computer capable of performing the functions and operations described herein. Computer system 1700 can be implemented as, or coupled to, controller 504. Computer system 1700 can be used, for example, to execute one or more operations in method 600, for normalizing raw avalanche counts detected by lidar apparatus 400.

Computer system 1700 includes one or more processors (also called central processing units, or CPUs), such as a processor 1704. Processor 1704 is connected to a communication infrastructure or bus 1706. Computer system 1700 also includes input/output device(s) 1703, such as monitors, keyboards, pointing devices, etc., that communicate with communication infrastructure or bus 1706 through input/output interface(s) 1702. Lidar apparatus 400 can receive instructions to implement functions and operations described herein—e.g., method 600 of FIG. 6—via input/output device(s) 1703. Computer system 1700 also includes a main or primary memory 1708, such as random access memory (RAM). Main memory 1708 can include one or more levels of cache. Main memory 1708 has stored therein control logic (e.g., computer software) and/or data. In some embodiments, the control logic (e.g., computer software) and/or data can include one or more of the operations described above with respect to method 600 of FIG. 6.

Computer system 1700 can also include one or more secondary storage devices or memory 1710. Secondary memory 1710 can include, for example, a hard disk drive 1712 and/or a removable storage device or drive 1714. Removable storage drive 1714 can be a floppy disk drive, a magnetic tape drive, a compact disk drive, an optical storage device, tape backup device, and/or any other storage device/drive.

Removable storage drive 1714 can interact with a removable storage unit 1718. Removable storage unit 1718 includes a computer usable or readable storage device having stored thereon computer software (control logic) and/or data. Removable storage unit 1718 can be a floppy disk, magnetic tape, compact disk, DVD, optical storage disk, and/any other computer data storage device. Removable storage drive 1714 reads from and/or writes to removable storage unit 1718 in a well-known manner.

According to some embodiments, secondary memory 1710 can include other means, instrumentalities or other approaches for allowing computer programs and/or other instructions and/or data to be accessed by computer system 1700. Such means, instrumentalities or other approaches can include, for example, a removable storage unit 1722 and an interface 1720. Examples of the removable storage unit 1722 and the interface 1720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, secondary memory 1710, removable storage unit 1718, and/or removable storage unit 1722 can include one or more of the operations described above with respect to method 600 of FIG. 6.

Computer system 1700 can further include a communication or network interface 1724. Communication interface 1724 enables computer system 1700 to communicate and interact with any combination of remote devices, remote networks, remote entities, etc. (individually and collectively referenced by reference number 1728). For example, communication interface 1724 can allow computer system 1700 to communicate with remote devices 1728 over communications path 1726, which can be wired and/or wireless, and which can include any combination of LANs, WANs, the Internet, etc. Control logic and/or data can be transmitted to and from computer system 1700 via communication path 1726.

The operations in the preceding embodiments can be implemented in a wide variety of configurations and architectures. Therefore, some or all of the operations in the preceding embodiments—e.g., method 600 of FIG. 6—can be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, computer system 1700, main memory 1708, secondary memory 1710 and removable storage units 1718 and 1722, as well as tangible articles of manufacture embodying any combination of the foregoing. Such control logic, when executed by one or more data processing devices (such as controller 504), causes such data processing devices to operate as described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    detecting laser signals reflected from a target, by sensing an accumulation of single photons by a photon detector;
    creating an avalanche histogram from the detected laser signals;
    transforming the avalanche histogram to an avalanche probability histogram by framing raw data from the photon detector as a sequence of Bernoulli trials within a timestamp interval and applying a binomial confidence estimation;
    transforming the avalanche probability histogram into a linearized intensity histogram by correcting waveform distortion; and
    determining a photon intensity of the reflected laser signals from an average count rate and an average photon flux rate associated with the linearized intensity histogram.

2. The method of claim 1, wherein detecting the laser signals comprises using a high sensitivity Geiger-mode avalanche photodiode (GmAPD) detector as the photon detector to sense the accumulation of the single photons.

3. The method of claim 1, further comprising merging adjacent Bernoulli trials when a reflected laser signal spans multiple time bins of the avalanche histogram.

4. The method of claim 1, wherein transforming the avalanche histogram to an avalanche probability histogram comprises normalizing lidar data in which signals are distinguished relative to background noise.

5. The method of claim 4, wherein normalizing the lidar data suppresses multiple peaks caused by re-arming the photon detector.

6. The method of claim 1, further comprising superimposing a tunable noise threshold curve on one or more of the avalanche histogram, the avalanche probability histogram, and the linearized intensity histogram.

7. The method of claim 6, wherein superimposing the tunable noise threshold depends on a user-specified minimum confidence threshold.

8. A system, comprising:
    a memory configured to store instructions; and
    at least one processor coupled to the memory and configured to execute the instructions to perform operations comprising:
        detecting laser signals reflected from a target, by sensing an accumulation of single photons by a photon detector;
        creating an avalanche histogram from the detected laser signals;
        transforming the avalanche histogram to an avalanche probability histogram by framing raw data from the photon detector as a sequence of Bernoulli trials within a timestamp interval and applying a binomial confidence estimation;
        transforming the avalanche probability histogram into a linearized intensity histogram by correcting waveform distortion; and
        determining a photon intensity of the reflected laser signals from an average count rate and an average photon flux rate associated with the linearized intensity histogram.

9. The system of claim 8, wherein the at least one processor is configured to perform operations further comprising merging adjacent Bernoulli trials when a reflected laser signal spans multiple time bins of the avalanche histogram.

10. The system of claim 8, wherein transforming the avalanche histogram to an avalanche probability histogram comprises normalizing lidar data in which signals are distinguished relative to background noise.

11. The system of claim 8, wherein detecting the laser signals comprises using a high sensitivity Geiger-mode avalanche photodiode (GmAPD) detector as the photon detector to sense the accumulation of the single photons.

12. The system of claim 8, wherein the at least one processor is configured to perform operations further comprising superimposing a tunable noise threshold curve on one or more of the avalanche histogram, the avalanche probability histogram, and the linearized intensity histogram.

13. The system of claim 12, wherein superimposing the tunable noise threshold depends on a user-specified minimum confidence threshold.

14. A non-transitory computer-readable medium having instructions stored thereon that, when executed by at least one computing device, cause the at least one computing device to perform operations comprising:
    detecting laser signals reflected from a target, by sensing an accumulation of single photons by a photon detector;
    creating an avalanche histogram from the detected laser signals;
    transforming the avalanche histogram to an avalanche probability histogram by framing raw data from the photon detector as a sequence of Bernoulli trials within a timestamp interval and applying a binomial confidence estimation;
    transforming the avalanche probability histogram into a linearized intensity histogram by correcting waveform distortion; and
    determining a photon intensity of the reflected laser signals from an average count rate and an average photon flux rate associated with the linearized intensity histogram.

15. The non-transitory computer-readable medium of claim 14, wherein detecting the laser signals comprises using a high sensitivity Geiger-mode avalanche photodiode (GmAPD) detector as the photon detector to sense the accumulation of the single photons.

16. The non-transitory computer-readable medium of claim 14, further comprising merging adjacent Bernoulli trials when a reflected laser signal spans multiple time bins of the avalanche histogram.

17. The non-transitory computer-readable medium of claim 14, wherein transforming the avalanche histogram to an avalanche probability histogram comprises normalizing lidar data in which signals are distinguished relative to background noise.

18. The non-transitory computer-readable medium of claim 17, wherein normalizing the lidar data suppresses multiple peaks caused by re-arming the photon detector.

19. The non-transitory computer-readable medium of claim 14, further comprising superimposing a tunable noise threshold curve on one or more of the avalanche histogram, the avalanche probability histogram, and the linearized intensity histogram.

20. The non-transitory computer-readable medium of claim 19, wherein superimposing the tunable noise threshold depends on a user-specified minimum confidence threshold.

\* \* \* \* \*